US012649641B2

(12) United States Patent
Nitsche

(10) Patent No.: US 12,649,641 B2
(45) Date of Patent: Jun. 9, 2026

(54) CAR TRANSPORT UNIT FOR A CAR OF A PASSENGER TRANSPORT SYSTEM AND METHOD FOR PRODUCING A SHAFT OF A PASSENGER TRANSPORT SYSTEM

(71) Applicant: Inventio AG, Hergiswil (CH)

(72) Inventor: Torsten Nitsche, Kreuzlingen (CH)

( * ) Notice: Subject to any disclaimer, the term of this patent is extended or adjusted under 35 U.S.C. 154(b) by 231 days.

(21) Appl. No.: 18/255,114

(22) PCT Filed: Nov. 22, 2021

(86) PCT No.: PCT/EP2021/082498

§ 371 (c)(1),
(2) Date: May 31, 2023

(87) PCT Pub. No.: WO2022/122364

PCT Pub. Date: Jun. 16, 2022

(65) Prior Publication Data

US 2024/0010467 A1 Jan. 11, 2024

(30) Foreign Application Priority Data

Dec. 7, 2020 (EP) .................................... 20212115

(51) Int. Cl.
*B66B 19/04* (2006.01)
*B66B 11/00* (2006.01)

(52) U.S. Cl.
CPC .......... *B66B 19/04* (2013.01); *B66B 11/0005* (2013.01); *B66B 11/0065* (2013.01)

(58) Field of Classification Search
CPC ......... B66B 19/04; B66B 11/02; B66B 19/00; B66B 7/00; B65D 85/68
See application file for complete search history.

(56) References Cited

U.S. PATENT DOCUMENTS

| | | | | |
|---|---|---|---|---|
| 4,231,148 A * | 11/1980 | Harding | ................ | E04F 17/005 29/469 |
| 4,986,040 A * | 1/1991 | Prewer | .................. | B66B 11/005 52/79.5 |
| 5,012,621 A * | 5/1991 | Power | ................. | E04B 1/34869 52/745.03 |
| 6,079,520 A | 6/2000 | Black et al. | | |
| 2021/0078826 A1* | 3/2021 | Mohammed | .......... | B66B 1/3492 |
| 2022/0024723 A1* | 1/2022 | Laitinen | ................ | E04F 17/005 |

(Continued)

FOREIGN PATENT DOCUMENTS

| | | | | |
|---|---|---|---|---|
| AU | 625660 B2 * | 7/1992 | | |
| CN | 107963533 A * | 4/2018 | ........... | B66B 5/0006 |
| CN | 108557611 A * | 9/2018 | | |

(Continued)

OTHER PUBLICATIONS

Machine translation of CN 211812919 U (Guo et al.) (Year: 2020).*

*Primary Examiner* — Minh Truong
*Assistant Examiner* — Michelle M Mudwilder
(74) *Attorney, Agent, or Firm* — Schlee IP International, PC; Alexander R. Schlee; Pascal A. Schlee

(57) ABSTRACT

A car transport unit for a car of a passenger transport system includes the car, a shaft segment of the passenger transport system, and a plurality of detachable transport devices. The car is arranged in the shaft segment and is connected to the shaft segment in a safe-to-transport manner using the transport devices.

8 Claims, 1 Drawing Sheet

(56) References Cited

U.S. PATENT DOCUMENTS

| | | | | |
|---|---|---|---|---|
| 2024/0017965 | A1* | 1/2024 | Bellissimo | B66B 5/0087 |

FOREIGN PATENT DOCUMENTS

| | | | | | |
|---|---|---|---|---|---|
| CN | 207827619 | U | * | 9/2018 | |
| CN | 208008246 | U | * | 10/2018 | B66B 7/00 |
| CN | 208531965 | U | * | 2/2019 | |
| CN | 109399420 | A | * | 3/2019 | B66B 11/0035 |
| CN | 111792198 | A | * | 10/2020 | B65D 85/68 |
| CN | 211812919 | U | * | 10/2020 | |
| DE | 202014000273 | U1 | * | 5/2014 | B66B 11/00 |
| EP | 0985628 | A2 | | 3/2000 | |
| EP | 2559647 | A1 | | 2/2013 | |
| JP | H1087230 | A | | 4/1998 | |
| JP | 3026257 | B2 | | 3/2000 | |
| JP | 2002114467 | A | | 4/2002 | |
| JP | 2005314017 | A | | 11/2005 | |
| JP | 2010089918 | A | | 4/2010 | |
| NL | 2002869 | C2 | | 11/2010 | |
| WO | 8908753 | A1 | | 9/1989 | |

* cited by examiner

CAR TRANSPORT UNIT FOR A CAR OF A PASSENGER TRANSPORT SYSTEM AND METHOD FOR PRODUCING A SHAFT OF A PASSENGER TRANSPORT SYSTEM

FIELD

The present invention relates to a car transport unit for a car of a passenger transport system and to a method for producing a shaft of a passenger transport system.

BACKGROUND

A passenger transport system, e.g., in the form of an elevator, has at least one car in which persons and objects can be accommodated in order to be transported within a building.

In order to erect the passenger transport system in the structure, the passenger transport system can be transported into the erected building in individual parts or in a partially disassembled state, and assembled on-site. In this case, a maximum size of individual parts of the passenger transport system is limited by a size of openings of the structure that are to be passed through. In particular, accesses to a shaft of the passenger transport system can limit, for example, the size of parts and components of the passenger transport system that are to be accommodated in the shaft.

The car can be the largest and heaviest component of the passenger transport system. The car can be assembled at the bottom of the shaft from individual parts and assemblies. The individual parts can have a significant dead weight and therefore require a great deal of effort on the part of an installer carrying out the work.

SUMMARY

Among other things, there can be a need for an improved car transport unit for a passenger transport system and an improved method for producing a shaft of a passenger transport system.

Such a need can be met by a car transport unit for a passenger transport system and a method for producing a shaft of a passenger transport system according to advantageous embodiments defined and described in the description.

According to a first aspect of the invention, a car transport unit for a car of a passenger transport system is proposed, wherein the car transport unit comprises the car, a shaft segment of the passenger transport system, and a plurality of detachable transport devices, wherein the car is arranged in the shaft segment and is connected to the shaft segment in a safe-to-transport manner using the transport devices.

According to a second aspect of the invention, a method of producing a shaft of a passenger transport system is proposed, wherein a car transport unit is placed on a foundation of the shaft according to the approach presented herein, wherein at least one further shaft segment is placed on the shaft segment to erect the shaft above the car.

Possible features and advantages of embodiments of the invention can be considered, inter alia and without limiting the invention, to be based upon the concepts and findings described below.

A passenger transport system can be understood as an elevator system. The passenger transport system can have at least one car that can be moved along guide rails. The passenger transport system can also have several cars. The car can be relocatable within a shaft of a building.

The shaft can be constructed from several shaft segments while the building is being constructed. The shaft segments can be prefabricated and arranged on top of each other on-site and connected to the rest of the building. Each shaft segment can have several plate-like wall sections surrounding a shaft interior. The wall sections can face each other in pairs and spaced apart. For example, a shaft segment can have a quadrangular, and in particular rectangular, cross-section, and opposing wall sections can run parallel to each other. Each shaft segment can be designed to be sufficiently loadable mechanically so that it can support shaft regions above it, and a common shaft of the passenger transport system can be formed overall from several shaft regions. For example, the shaft segments can be formed with concrete, steel-reinforced concrete, metal elements, metal panels, wooden panels, or the like. For example, the shaft segments can be transported by truck to the building site and lifted into place by crane. One of the shaft segments can be used as a kind of transport packaging for the car. Wall sections of the shaft segment can surround the car on all sides and therefore protect it during transport. The shaft segment can have a height which is at least as large as a height of the car accommodated therein. The shaft segments can be designated as prefabricated components or prefab elements.

The shaft segments can have fastening points for components of the passenger transport system. For example, the fastening points can be cast-in threads. The fastening points can also be used as attachment points for slinging means for lifting the shaft segment, or can be provided for this purpose only. The shaft segments can have prefabricated door openings or access openings. The shaft can be a load-bearing component of the passenger transport system. A bottommost shaft segment can be placed on a previously created foundation of the passenger transport system.

The car can be delivered as a prefabricated component with the shaft segment. The car can be fully assembled at the factory. The car can be transported within the shaft segment. In particular, the car can be transported in the bottommost shaft segment and, with the bottommost shaft segment, placed on the foundation. The shaft with the car already placed therein can therefore be erected during the construction of the building. The car can be transported wrapped in a protective film, for example. The car can be secured in the shaft segment using several transport devices. The transport devices can prevent relative movements between the car and the shaft segment, or at least keep them to a minimum so that the car cannot collide with the shaft segment even in the event of sudden movements during transport. In particular, the transport devices can be configured to transfer arising weight forces and inertial forces between the car and the shaft segment.

For this purpose, a transport device for a car of a passenger transport system is proposed, wherein the transport device has a car side, a shaft side, and an intermediate part between the car side and the shaft side, wherein the car side has at least one contact surface for placing against the car, and the shaft side has at least one contact surface for placing against a shaft segment of the passenger transport system.

The transport device can be disposed between the shaft segment and the car. The transport device can transfer forces, arising during transport, along a main extension direction of the intermediate part between the car and the shaft segment. A length of the transport device can be adapted to a distance between the car and the shaft segment via the intermediate part. For example, the intermediate part can be adjustable in length. Several transport devices can be arranged at different locations between the shaft segment and the car to safely prevent contact between the car and the shaft segment during transport and installation. The transport devices can be oriented in different directions to prevent movement of the car in those directions. Two transport devices each can be arranged on opposite sides of the car and oriented in opposite directions. The car can be arranged between the transport devices.

A contact surface of the intermediate part, provided on the car or shaft side, of the transport device can be adapted to a contour of a contact point of the car or shaft segment. The forces can be introduced from the contact point into the transport device via the contact surfaces, or can be introduced from the transport device into the contact point via the contact surface. In particular, the forces can be compressive forces.

The intermediate part can have at least one, length-adjustable screw connection. A screw connection can be adjusted in length by turning. The screw connection can be self-locking. The intermediate part can have at least a part of the screw connection. A rotatable, elongated threaded rod of the screw connection can have an external thread that, at each end thereof, is threaded into an internal thread. The internal threads can each be arranged in a connecting element, wherein one connecting element can be connected to the car-side contact surface, and the other connecting element can be connected to the shaft-side contact surface.

The intermediate part, and in particular the threaded rod, can have a tool engagement point for adjusting the screw connection. Via a tool engagement point, the screw connection can be adjusted using a tool. A tool engagement point can, for example, be a hexagon for attaching an open-end wrench, recesses for a hook wrench, or at least a through-hole for a rod.

The intermediate part can have two screw connections running in opposite directions. The tool engagement point can be located between the screw connections. By means of screw connections running in opposite directions, i.e., a right-hand thread and a left-hand thread, the length of the intermediate part can be adjusted twice as quickly as with a single thread of the same pitch. The second screw connection eliminates the need for a rotatable bearing on one of the connections.

The intermediate part can have a damping element. A damping element can be arranged between two sections of the intermediate part. The damping element can dampen, but allow, relative movement between the sections. The damping element can have an elastic spring. The damping element can also have an elastomer.

The car side of the intermediate part can have at least one further contact surface for placing against an edge of the car. The contact surface and the additional contact surface can be arranged at an angle of the edge with respect to each other. By having two contact surfaces, the car-side contact surface can lie against two walls of the car. The different angles of the contact surfaces can limit or prevent lateral movements of the car-side contact surface. The contact surfaces can also be spaced apart. This means that a direct introduction of force into the edge of the car can be avoided.

The shaft side of the intermediate part can, for placement in a corner of the shaft segment, have at least one additional contact surface. The contact surface and the additional contact surface can be arranged at an angle of the corner to each other. By means of two contact surfaces, the shaft side of the intermediate part can lie against two walls of the shaft segment. Due to the different angles of the contact surfaces, lateral movements of the shaft side of the intermediate part can be restricted or prevented.

A damping plate can be arranged on at least one of the contact surfaces. A damping plate can be made of an elastomer. The damping plate can prevent damage to the opposite face. The damping plate can dampen vibrations during transportation.

The car side of the intermediate part can have a suspension device for suspension in a suspension geometry of the car. A suspension device may permit a form-fit connection between the car and the transport device in a direction of force of the transport device. In particular, a suspension geometry can be arranged on a load-bearing rack or frame of the car. For example, the suspension geometry can be a recess or a protrusion. The suspension device can be separated from the suspension geometry by a displacement and/or twisting transverse to the direction of force. The suspension device allows the transport device to also transmit tensile forces in particular.

The shaft side of the intermediate part can have a suspension device for suspension in a suspension geometry of the shaft segment. A suspension device can enable a positive connection between the shaft segment and the transport device in a direction of force of the transport device. A suspension geometry can be arranged in particular at a contact point of the shaft segment. The suspension geometry can also be located on an outer side of the shaft segment. In this case, the suspension geometry can extend above or around an upper edge or lower edge of the shaft segment. For example, the suspension geometry can be a recess or a protrusion. The suspension device can be separated from the suspension geometry by a displacement and/or twisting transverse to the direction of force. The suspension device allows the transport device to also transmit tensile forces in particular.

The transport devices can be removed before the passenger transport system is completely installed and subsequently put into operation. In particular, the transport devices can be removed before one or more additional shaft segments are placed on top. The transport devices are no longer required after the transport and subsequent mounting of the first shaft segment together with the car. The transport devices can be removed, as long as they are easily accessible.

A weight of the car can be supported by the transport devices. The weight can be introduced into the shaft segment. The transport devices can keep the car at a distance from a transporting truck to prevent transport damage due, for example, to friction.

The transport devices can be spread between the shaft segment and the car. For spreading, the transport devices can be extended in a gap between the shaft segment and the car until they exert a compressive force on the car and the shaft segment. The car can be clamped by the transport devices.

The transport devices can be suspended from the shaft segment and/or the car. The transport devices can be suspended in at least one undercut on each side. The undercut provides a form-fit for force transmission. The transport devices can therefore transmit tensile forces between the shaft segment and the car. Suspended transport devices allow the transport devices to transmit tensile forces and compressive forces.

Attachment points for lifting the car transport unit can be arranged on the transport devices. Each transport device can have at least one attachment point for lifting the car and the shaft segment. The crane can be suspended at the attachment point for lifting the shaft segment together with the car.

It is also possible for the weight of the car to not be supported by the transport devices; instead, the car, during transport on a truck, is supported directly or indirectly on the truck. In this case, when the car transport unit is lifted into the building, both the shaft segment and the car can be suspended from the crane by a rope.

The transport devices can be located between edges of the car and corners of the shaft segment. The transport devices can be arranged in the region of the diagonals of the shaft segment and the car. The edges of the car can be reinforced by a scaffold or frame of the car. Forces can be introduced into the reinforced edges without damaging the car.

The transport devices can be arranged in pairs on diametrically-opposed sides of the car. The transport devices arranged in pairs can compensate for mutually-introduced forces. A symmetrical arrangement of the transport devices can prevent excessively asymmetrical forces acting on the car, or even deformations of the car.

The car transport unit can have a bottommost or first shaft segment of the passenger transport system. In particular, the car can be transported in the bottommost shaft segment and lifted or raised with the first shaft segment. The additional shaft segments can be put on later, while the car stands ready at the lower end of the shaft.

It is also possible for the car transport unit to comprise additional components of the passenger transport system, i.e., these components are also transported to the construction site in the shaft segment. These components can therefore be transported to the construction site protected from the shaft segment on the one hand, and with little effort on the other. In particular, a counterweight of an elevator can be part of the car transport unit. In addition, other components such as guide rails, assembly material, etc., are also possible. In this case, the components are secured within the car transport unit, and in particular fixed to the shaft segment. The components can also be arranged inside the car, for example.

Embodiments of the invention will be described below with reference to the accompanying drawings, wherein neither the drawings nor the description are to be interpreted as limiting the invention.

The drawings are merely schematic, and not to scale. Like reference signs denote like or equivalent features in the various drawings.

DETAILED DESCRIPTION

Figure 1:
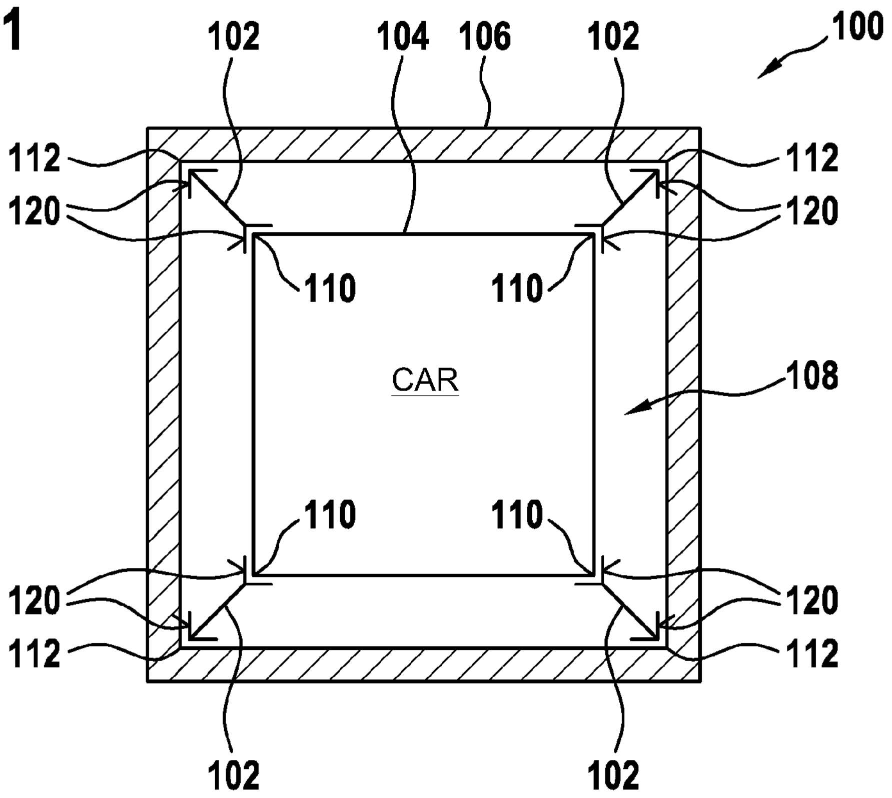
FIG. 1 shows a representation of a car transport unit according to an exemplary embodiment.

FIG. 1 shows a representation of a car transport unit 100 according to an exemplary embodiment. Here, the car transport unit 100 comprises four transport devices 102, a car 104 of a passenger transport system not further shown, and a shaft segment 106 of the passenger transport system. The car 104 is arranged within the shaft segment 106 for transport. The car 104 is a prefabricated part. The car 104 can be fully assembled. The shaft segment 106 is also a prefabricated part. The car transport unit 100 is delivered complete and lifted to a place of use at the construction site.

To complete the passenger transport unit, a shaft of the passenger transport unit is erected at the place of use from additional shaft segments above the shaft segment 106 with the car 104, and, subsequently, the car 104 is connected to, basically, only a drive and control system of the passenger transport unit. Several shaft segments 106 are stacked on top of each other at the construction site to form the shaft of the passenger transport system, until a desired height of the shaft is achieved. The drive may then be arranged, for example, in a topmost shaft segment.

During transport, the transport devices 102 are arranged at different locations in an intermediate space 108 between the car 104 and the shaft segment 106. In this case, the car 104 and the shaft segment 106 are, for example, square. The transport devices 102 are arranged between edges 110 of the car 104 and corners 112 of the shaft segment 106. Two of each of the transport devices 102 therefore engage opposite edges 110 of the car 104 and are therefore oriented in opposite directions. The four transport devices 102 fix the car 104 in the shaft segment 106 in all directions.

Each of the transport devices 102 is adjustable in length and has contact surfaces 120 for lying against walls of the car 104 or walls of the shaft segment 106. The contact surfaces 120 are aligned with the walls; the contact surfaces 120 therefore lie flat against the walls of the car 104 or the shaft segment 106.

The car 104 is transported within the shaft segment 106. During transport, the car 104 is protected in the shaft segment 106. At the place of use or the destination, the shaft segment 106 and the car 104 are lifted together, e.g., by means of a crane, and placed on a foundation of the passenger transport system to be erected. Additional shaft segments are transported and placed on top of the shaft segment 106. Until the shaft is completed, the car 104 remains in the bottommost shaft segment 106.

Figure 2:
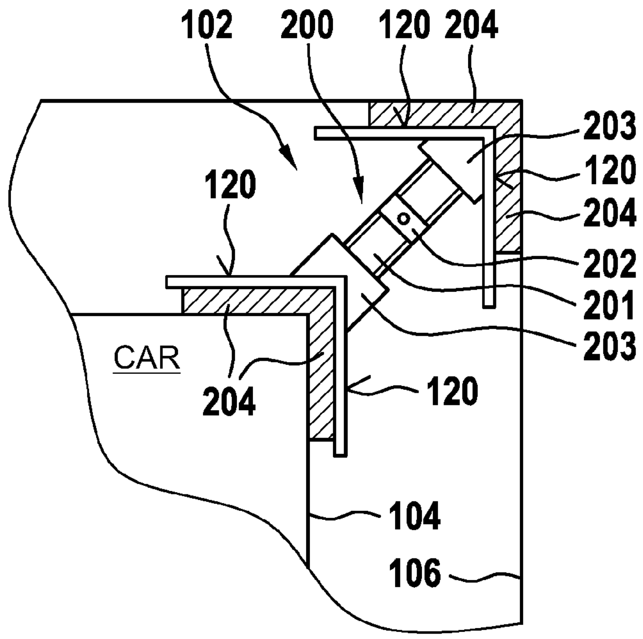
FIG. 2 shows a representation of a transport device of a car transport unit according to an exemplary embodiment.

FIG. 2 shows a representation of a transport device 102 for a car transport unit 100 according to an exemplary embodiment. The transport device 102 corresponds substantially to one of the transport devices in FIG. 1. Here, the transport device 102 has a length-adjustable intermediate part in the form of a screw connection 200. A rotatable, elongated threaded rod 201 of the screw connection 200 and therefore the transport device 102 has an external thread which, at each of its ends, is screwed into an internal thread. The internal threads are each arranged in a connecting element 203, wherein one connecting element 203 is connected to the car-side contact surface 120, and the other connecting element 203 is connected to the shaft-side contact surface 120. By screwing in or unscrewing the screw connection, a distance between the two contact surfaces 120 and therefore a length of the transport device 102 can be adjusted.

In one exemplary embodiment, the intermediate part has a tool engagement point 202. A tool can be applied to the tool engagement point 202 to rotate the intermediate part. The tool engagement point allows a form fit between the intermediate part and the tool. By means of the tool, a larger lever results, and greater torque can be achieved. The tool can be removed for transportation.

In one exemplary embodiment, the threaded rod 200 of the intermediate part has two, oppositely-threaded connections. Here, a right-hand thread and a left-hand thread are each screwed into corresponding connecting elements 203. The counter-rotating screw connections allow the length to be changed by twice the pitch of the screw connections per revolution of the intermediate part. The tool engagement point 202 is arranged between the two screw connections of the threaded rod 200. The tool engagement point 202 can be used as an attachment point for lifting the car transport unit 100.

In one embodiment, damping plates 204 or pads made of an elastomer are arranged on the contact surfaces 120. The damping plates 204 protect the surfaces of the car 104 and the shaft segment 106 and dampen vibrations during transport.

In one embodiment, the transport device 102 is configured to transmit tensile forces between the car 104 and the shaft segment 106. For this purpose, the contact surfaces 120 form a form-fit with their contact points on the car 104 or the shaft segment 106. For example, a protrusion may engage in a corresponding recess. The protrusion may be configured as a hook or pin. The recess may be configured as a recess or aperture. Likewise, the form-fit may be achieved by a screw connection.

Finally, it should be noted that terms such as "comprising," "having," etc., do not exclude other elements or steps, and terms such as "a" or "an" do not exclude a plurality. Furthermore, it should be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A car transport unit for a car of a passenger transport system, the car transport unit comprising:

a car;

a shaft segment of the passenger transport system; and a plurality of detachable transport devices;

wherein the car is arranged in the shaft segment and is connected to the shaft segment by the transport devices enabling the car to be transported within the shaft segment to a construction site of the passenger transport system;

wherein the transport devices telescopically extend between the shaft segment and the car, thereby clamping the car in the shaft segment by compressive forces acting via the transport devices between the shaft segment and the car; and wherein the transport devices are arranged between edges of the car and corners of the shaft segment.

2. The car transport unit according to claim 1 wherein a weight of the car is supported by the transport devices.

3. The car transport unit according to claim 1 wherein the transport devices are suspended on the shaft segment and/or on the car.

4. The car transport unit according to claim 1 wherein each of the transport devices has a car side, a shaft side and an intermediate part that extends between the car side and the shaft side and is adjustable in length, the car side has a car-side contact surface adapted to be placed against the car, and the shaft side has a shaft-side contact surface adapted to be placed against the shaft segment.

5. The car transport unit according to claim 4 wherein the intermediate part includes a length-adjustable screw connection adapted to vary a distance between the car-side contact surface and the shaft-side contact surface.

6. The car transport unit according to claim 1 wherein the transport devices are arranged in pairs on diametrically-opposed sides of the car.

7. The car transport unit according to claim 1 wherein the shaft segment is adapted to be a bottommost shaft segment of the passenger transport system.

8. A car transport unit for a car of a passenger transport system, the car transport unit comprising:

a car;

a shaft segment of the passenger transport system; and a plurality of detachable transport devices;

wherein the car is arranged in the shaft segment and is connected to the shaft segment by the transport devices enabling the car to be transported within the shaft segment to a construction site of the passenger transport system;

wherein the transport devices telescopically extend between the shaft segment and the car, thereby clamping the car in the shaft segment by compressive forces acting via the transport devices between the shaft segment and the car; and wherein attachment points adapted to lift the car transport unit are arranged on the transport devices.

* * * * *